United States Patent [19]

Yamanaka et al.

[11] Patent Number: 5,009,936

[45] Date of Patent: Apr. 23, 1991

[54] METHOD FOR FORMING TRANSPARENT MULTILAYERS

[75] Inventors: Masahiko Yamanaka, Kanagawa; Motoyoshi Hanaoka; Hiroaki Konse, both of Tokyo; Haruhisa Shigeno, Saitama, all of Japan; Masakatsu Kinoshita, Rocky River, Ohio

[73] Assignees: Nissan Motor Co., Ltd., Kanagawa; Nippon Paint Co. Ltd., Osaka, both of Japan

[21] Appl. No.: 402,718

[22] Filed: Sep. 5, 1989

[30] Foreign Application Priority Data

Sep. 2, 1988 [JP] Japan ................................ 63-219668

[51] Int. Cl.$^5$ .......................... B05D 1/36; B05D 7/00
[52] U.S. Cl. .................................. 427/407.1; 427/409
[58] Field of Search .......................... 427/407.1, 409; 428/422

[56] References Cited

U.S. PATENT DOCUMENTS

| | | | |
|---|---|---|---|
| 4,728,545 | 3/1988 | Kurauchi et al. | 427/409 |
| 4,759,961 | 7/1988 | Kato et al. | 427/409 X |
| 4,871,591 | 10/1989 | Sugimura et al. | 427/409 X |
| 4,882,228 | 11/1989 | Nakahama | 427/409 X |

Primary Examiner—Michael Lusignan

Attorney, Agent, or Firm—Sughrue, Mion, Zinn, Macpeak & Seas

[57] ABSTRACT

A method for forming a transparent multilayer is described, using a wet-on-wet process in which first a transparent acrylic copolymer paint A and then a transparent fluorine-containing polymer paint B comprising the formula

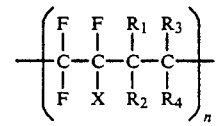

wherein X represents a fluorine atom or chlorine atom, and $R_1$, $R_2$, $R_3$, $R_4$ each represents represents a hydrogen atom, hydroxyalkyl group, or carboxyalkyl group, are applied on a conventional finish coating.

The method produces a protective multilayer consisting of a paint A layer to improve adhesion and a paint B layer to improve weatherability on the conventional finish coatings.

8 Claims, No Drawings

METHOD FOR FORMING TRANSPARENT MULTILAYERS

FIELD OF THE INVENTION

This invention relates to a method for forming a transparent paint film having good adhesion on conventional finish coatings.

BACKGROUND OF THE INVENTION

Finish paint films applied on surfaces, such as automobile bodies and facing components, show undesirable signs of deterioration including discoloration, fading, and blistering following long years of weathering.

Although the deterioration of conventional finish coat is effectively prevented by waxing or other means, such maintenance increase the user's work load.

To counter such inconvenience, several tests have been proposed to improve weatherability by forming a fluoride resin paint on a finish coat.

Japanese Patent Kokai Application No. 61/197074 describes an automobile finish coating in which a clear paint, mainly composed of a fluoride polymer having the formula (I), is applied on a solid color finish coat using a dry-on-wet process.

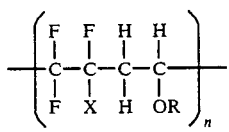
(I)

In formula (I), X is a fluorine atom or chlorine atom, and R is a hydroxyalkyl group or carboxyalkyl group. Japanese Patent Kokai Application No. 63/59373 describes a method of metallic finish involving painting a clear top coat on a metallic base coat. The top coat consists of mainly fluorine-containing polymer (A) and cross linking agent, and is soluble in organic solvents. Fluorine-containing polymer (A) incorporates fluoroolefin, hydroxyl, and carboxyl groups, and has an average molecular weight of from 3,000 to 20,000 and from 1 to 40 wt% fluorine atoms. These conventional methods to form protective layers have been viewed as a way to further improve weatherability, such as resistance to discoloration and weathering, but these methods have had a problem with respect to adhesion.

SUMMARY OF THE INVENTION

The object of this invention is to provide a method to form a transparent multilayers having a fluororesin on conventional finish coatings with good adhesion.

The method of this invention is directed to the formation of transparent multilayers formed by application on a conventional finish coating using a wet-on-wet process, first with a transparent paint A composed of an acrylic copolymer resin, and then a transparent paint B based on a fluorine-containing polymer comprising the formula

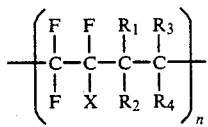

wherein X represents a fluorine or chlorine atom, and $R_1$, $R_2$, $R_3$, and $R_4$ each represents a hydrogen atom, hydroxyalkyl group, or carboxyalkyl group.

DETAILED DESCRIPTION OF PREFERRED EMBODIMENTS

Conventional finish coatings are formed by a common solid color paint or metallic color paint such as acrylic/melamine resin, polyester/melamine resin, and alkyd/melamine resin.

The transparent paint A, which is mainly composed of acrylic copolymer resin, incorporates functional monomers as components of the copolymer, including acidic type, such as acrylic acids and methacrylic acids; hydroxyl type, such as acrylic acid hydroxyethyl, methacrylic acid hydroxyethyl, and methacrylic acid hydroxypropyl; amide type, such as acrylamide and methacrylamide; or glycidyl type, such as acrylic acid glycidyl and methacrylic acid glycidyl.

Such monomers typically have a number average molecular weight of from 5,000 to 30,000, preferably from 10,000 to 20,000, a hydroxyl value per gram of solid content of from 30 to 100, preferably from 45 to 80, and an acid value of from 5 to 20, preferably from 8 to 15.

Acrylic copolymer used in the transparent paint A is cured by baking using a crosslinking agent such as alkyletherified melamine. The copolymer may be blended with dyes, organic tinting pigments, or inorganic fillers such as silica particles or barium sulphate, at a blending ratio of 5 wt % or less, which does not degrade the transparency of the transparent paint A. The blending ratio of above-described acrylic copolymer to melamine resin ranges from 90/10 to 70/30 by weight (solids ratio).

The fluorine-containing polymer which substantially constitutes the transparent paint B is composed such that a number average molecular weight is from 3,000 to 20,000, hydroxyl value per gram of solid content is from 45 to 110, acid value per gram of solid content is from 5 to 12, and has the formula

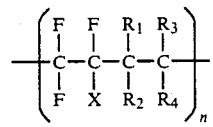

wherein X represents a fluorine or chlorine atom, and $R_1$, $R_2$, $R_3$, and $R_4$ (which may be the same or different) each represents a hydrogen atom, hydroxyalkyl group, or carboxyalkyl group. The crosslinking agents to cure a fluorine-containing polymer include amino resins, such as methylolated or alkyletherified melamine resin and urea resin; polyisocyanates, such as hexamethylene diisocyanate, isophorondiisocyanate, xylylenediisocyanate, tolylenediisocyanate, and lysinediisocyanate; polyisocyanate compounds having more than one free isocyanate group within one molecule, which are formed by adding a polyhydric alcohol to one of the above polyisocyantes, and blocked polyisocyanate compounds which are formed by a blocked polyisocyanate compound with a hydroxyl group-containing compound. The blending ratio of fluorine-containing polymer to amino resin is preferably in the range of 100:25–70 parts by weight.

The blending ratio of polyisocyanate compound to the fluorine-containing polymer is preferably in the range of from 0.3 to 1.5 (mole ratio of isocyanate group/hydroxyl group). The blended composition is dissolved in an adequate organic solvent at a concentration of from 20 to 50% to prepare the clear paint B. Useful organic solvents include, for example, acetone, methylethylketone, methylisobutylketone, ethylacetate, butylacetate, Cellosolve acetate, tetrahydrofuran, methanol, ethanol, butanol, toluene, xylene, dimethylsulfoxide, dimethylformamide, and dimethylacetamide.

The transparent multilayers of this invention are formed on the conventional finish coatings by successively applying the transparent paint A composed of the above described acrylic copolymer, and then the transparent paint B composed of the fluorine-containing polymer, using a wet-on-wet process, and the simultaneously curing these transparent multilayers.

The transparent paint A is uniformly applied on the conventional finish coatings at a thickness of from 5 to 20 microns (dry thickness) using a conventional method. After approximately 2 to 4 minutes, flash off of solvents of the transparent paint film A has occurred, and transparent paint B is applied. The transparent paint B is applied at a thickness of from 20 to 40 microns using a conventional method on the transparent paint film A, which has not yet dried. After setting for approximately 10 minutes, the applied films are baked. The standard conditions of baking are 30 minutes or less at 140° C.

The transparent multilayer formed by the above described procedure is structured such that the transparent paint B of the fluorine-containing polymer is coated on the conventional finish coating via the transparent paint A of acrylic copolymer resin with a wet-on-wet process. Since the transparent paint A gives improved adhesion and the transparent paint B gives improved weatherability and good dirt resistance, the multilayers offer extremely stable protective performance for long years.

EXAMPLES

The invention is described in more detail in the following Examples. Parts are by weight unless otherwise indicated. Fluororesins were produced by the autoclave reaction of the compositions listed in Table 1 at 65° C. for 10 hours.

TABLE 1

|  | Example products of fluororesin | |
|---|---|---|
|  | 1 | 2 |
| Chloro-tri-fluoroethylene | 53 | 53 |
| Cyclohexylvinylether | 15 | 16 |
| Ethylvinylether | 12 | 13 |
| Hydroxybutylvinylether | 20 | 18 |
| Xylene | 142 | 111 |
| Ethanol | 40 | 32 |
| $K_2CO_3$ | 4.2 | 3.6 |
| AIBN* | 0.36 | 0.31 |

*Azobisisobutylonitrile

The example fluororesin products 1 and 2 were reacted with 1.43 weight parts and 0.9 weight parts of succinic anhydride per 100 weight parts of the solid resin, respectively, at 150° C. for 1 hour to obtain the modified fluororesins.

The hydroxyl value, acid value, and number average molecular weight of each of the modified fluororesins obtained are listed in Table 2.

TABLE 2

|  | Example product of modified fluororesin | |
|---|---|---|
|  | 1 | 2 |
| Hydroxyl value | 90 | 80 |
| Acid value | 8 | 5 |
| Number average molecular weight | 6000 | 9000 |

The obtained modified fluororesin products 1 and 2 were substituted with xylene to produce the modified fluororesin varnishes 1 and 2, each having a 50% solid content, respectively.

100 weight parts of the obtained modified fluororesin varnish 1 was mixed with 20.8 weight parts modified alkylether melamine resin (Uban 205E-60, made by Mitsui Toatsu Chemicals, Inc.), 10 weight parts of Solvesso 100 (made by Exxon Chemical Co.), and 0.2 weight parts of Modflo (made by Monsanto Co.) under conventional process to prepare paint samples of the transparent paint B-1, which would be used in Example 1.

EXAMPLE 1

On the conventional finish coating (2 coat/bake type metallic coatings) consisting of a metallic base coat of an acrylic/melamine resin type (SP-M-80 silver, made by NIPPON PAINT CO.) and a clear coat of acrylic/melamine resin type (SP-0-80 clear, made by NIPPON PAINT CO.), the acrylic paint (SP-M-80 clear, made by NIPPON PAINT CO.) was applied as the transparent paint A, and the fluorine-containing melamine curable top transparent paint was applied as the clear paint B-1.

Baking conditions, film thickness, and the evaluation of adhesion, appearance, and sanding marks are listed in Table 3.

EXAMPLE 2

On a conventional finish coating as in Example 1, the acrylic resin type clear paint (SP-M-80 clear, made by NIPPON PAINT CO.) as the transparent paint A, and then top transparent paint film B2 consisting of the modified fluororesin varnish 2 and the urethane isocyanate curing agent were applied, using a wet-on-wet process.

Baking conditions, film thickness, and the evaluation of adhesion, appearance, and sanding marks are listed in Table 3.

EXAMPLE 3

The multilayer was formed using the same paint combination of the transparent paints A and B as that used in Example 1, except that the conventional finish coat was formed with the polyester/melamine resin solid color paint (Orga-G-65 white made by NIPPON PAINT CO.).

Baking conditions, film thickness, and the evaluation of adhesion, appearance, and sanding marks are listed in Table 3.

REFERENCE EXAMPLE 1

On the same conventional finish coating as used in Example 1, the transparent paint B of the same type as used in Example 1 was directly formed.

Baking conditions, film thickness, and the evaluation of adhesion, appearance, and sanding marks are listed in Table 3.

REFERENCE EXAMPLE 2

On the same type of finish coating as used in Example 3, the paint B of the same type as used in Example 3 was formed directly without applying transparent paint A.

Baking conditions, film thickness, and the evaluation of adhesion, appearance, and sanding marks are listed in Table 3.

TABLE 3

| Condition, property/Example No. | Example 1 | Example 2 | Example 3 | Reference Example 1 | Reference Example 2 |
|---|---|---|---|---|---|
| <Conventional finish coat film> | | | | | |
| Baking condition (°C. × min) | 140 × 20 | 140 × 20 | 140 × 20 | 140 × 20 | 140 × 20 |
| Film thickness (μm) | 20/40 | 20/40 | 40 | 20/40 | 20/40 |
| <Transparent multilayers> | | | | | |
| Baking condition (°C. × min) | 104 × 20 | 120 × 20 | 140 × 20 | 140 × 20 | 140 × 20 |
| Film thickness (μm) | 15/40 | 15/40 | 15/40 | 40 | 40 |
| <Property> | | | | | |
| Adhesion | O | O | O | X | X |
| Appearance | O | O | O | Δ | Δ-O |
| Sanding marks* | O | O | O | Δ | Δ |

(Note)
*The conventional finish coating was partially sanded with #1000 grade sand paper, the transparent paint was applied and baked, and then the evaluation was made.
O: No sanding mark was observed.
Δ: Sanding mark was observed.

As Table 3 clearly illustrates, all examples of this invention, Examples 1 through 3, which formed the clear paint film of fluorine-containing polymer applied with wet on wet process on the acrylic copolymer resin transparent paint film gave good results regarding adhesion, appearance, and sanding marks. On the contrary, Reference Examples 1 and 2, which had no acrylic copolymer transparent paint A film, showed poor adhesion, poor appearance, and sanding marks in comparison with those of Examples 1 through 3.

By using the method of this invention, a protective multilayer can be formed on the conventional finish coatings to give both a transparent layer which improves adhesion and a transparent top layer which has excellent weatherability. Consequently, all the problems which have been encountered in painting work are solved and stable transparent paint performance can be secured for long years without the need of troublesome maintenance, such as waxing the film surface.

While the invention has been described in detail and with reference to specific embodiments thereof, it will be apparent to one skilled in the art that various changes and modifications can be made therein without departing from the spirit and scope thereof.

What is claimed is:

1. A method for forming a transparent multilayer wherein first a transparent paint A comprising a film forming amount of an acrylic copolymer, wherein monomers incorporated to form the acrylic copolymer have an average molecular weight of from 5,000 to 30,000, a hydroxyl value per gram of solid content of from 30 to 100, and an acid value of from 5 to 20, and then a film forming amount of a transparent paint B, which is dissolved in organic solvent, of fluorine containing polymer comprising the formula

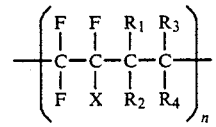

wherein X represents a fluorine or chlorine atom, and $R_1$, $R_2$, $R_3$, and $R_4$ each represents a hydrogen atom, hydroxyalkyl group, or carboxyalkyl group, are applied on a conventional finish coating with a wet-on-wet process.

2. A method for forming a transparent multilayer as in claim 1, wherein monomers incorporated to form the acrylic copolymer have an average molecular weight of from 10,000 to 20,000, a hydroxyl value per gram of solid content of from 45 to 80, and an acid value of from 8 to 15.

3. A method for forming a transparent multilayer as in claim 1, wherein the fluorine-containing polymer has a number average molecular weight of from 3,000 to 20,000, a hydroxyl value per gram of solid content of from 45 to 110, and an acid value of from 5 to 12.

4. A method for forming a transparent multilayer as in claim 3, wherein said fluorine containing polymer is cured with a cross linking agent.

5. A method for forming a transparent multilayer as in claim 4, wherein said cross linking agent is a melamine resin and the blending ratio of fluorine-containing polymers to amino resin is in the range of 100:25-70 parts by weight.

6. A method for forming a transparent multilayer as in claim 4, wherein said fluorine-containing polymer is cured with a polyisocyanate compound cross linking agent, and the blending ratio of polyisocyanate compound to the fluorine-containing polymer is in the range of from 0.3 to 1.5 (mol ratio of isocyanate group/hydroxyl group).

7. A method for forming a transparent multilayer as in claim 1, wherein said transparent paint A is applied at a thickness of from 5 to 20 microns (dry thickness).

8. A method for forming a transparent multilayer as in claim 7, wherein transparent paint B is applied at a thickness of from 20 to 40 microns (dry thickness) on transparent paint A.

* * * * *